United States Patent
Wallbank

[11] Patent Number: 5,505,499
[45] Date of Patent: Apr. 9, 1996

[54] PIPE COUPLING

[76] Inventor: Graham T. Wallbank, 11 Berwick Way, Heysham, Lancashire, United Kingdom, LA3 2UB.

[21] Appl. No.: 256,591
[22] PCT Filed: Jan. 15, 1993
[86] PCT No.: PCT/GB93/00098
  § 371 Date: Sep. 16, 1994
  § 102(e) Date: Sep. 16, 1994
[87] PCT Pub. No.: WO93/14340
  PCT Pub. Date: Jul. 22, 1993

[30] Foreign Application Priority Data
  Jan. 17, 1992 [DE] Germany ............... 92 00 983.6
  Oct. 20, 1992 [DE] Germany ............... 92 21 963.3

[51] Int. Cl.⁶ ................................................. F16L 3/04
[52] U.S. Cl. .................. 285/158; 285/177; 285/192; 285/337; 285/341
[58] Field of Search ....................... 285/158, 192, 285/337, 223, 177, 231, 341; 52/220.8

[56] References Cited

U.S. PATENT DOCUMENTS

| | | | |
|---|---|---|---|
| 4,071,265 | 1/1978 | Wallace | 285/158 |
| 4,071,267 | 1/1978 | Davis | 52/220.8 X |
| 4,174,126 | 11/1979 | Hauff | 285/158 |
| 4,353,580 | 10/1982 | Houck | 285/158 X |
| 5,060,986 | 10/1991 | Carter | 285/158 |
| 5,293,724 | 3/1994 | Cornwall | 285/158 X |

FOREIGN PATENT DOCUMENTS

| | | | |
|---|---|---|---|
| 612558 | 1/1961 | Canada | 285/158 |
| 275113 | 7/1988 | European Pat. Off. | 285/158 |
| 972414 | 1/1951 | France | 285/337 |
| 28276 | 6/1989 | Japan | 285/158 |

Primary Examiner—Dave W. Arola
Attorney, Agent, or Firm—Foley & Lardner

[57] ABSTRACT

A pipe coupling for casting into concrete comprising a sleeve having external flanges near its ends for attaching the coupling to formwork and a collar and seal ring mounted on at least one end of the sleeve for sealingly connecting at least one pipe thereto.

15 Claims, 3 Drawing Sheets

PIPE COUPLING

This invention concerns pipe couplings.

If a pipe is to be cast into a concrete wall or floor, formwork for the casting has to be altered to allow the pipe to pass through. That is time consuming and hence costly. Furthermore, the altered formwork will be less re-usable. Additional expense arises in supporting the pipe temporarily during casting. Alignment of the pipe is time consuming and difficult and often a source of error.

When alignment of a pipe to be cast in concrete is critical, the general practice is to make a hole in the concrete that is larger than the pipe. The pipe is then positioned later and secondary formwork used for casting concrete about the pipe. Obviously, that involves additional time, work and expense. Furthermore, the additional concrete joints may provide regions of weakness through which leakages may occur. Finally, the concrete may have an inferior surface appearance because of the two casting operations.

An object of this invention is to provide a way of casting pipes into concrete that avoids or at least mitigates against one or more of the above-mentioned disadvantages.

According to the invention there is provided a pipe coupling, which coupling may itself be cast into concrete and to which one or more pipes may be coupled.

A preferred pipe coupling of the invention comprises a sleeve having an external flange for attaching the coupling to formwork for concrete casting. The flange may be integral with or separable from the sleeve. The external flange may be spaced inwardly from one end of the sleeve, whereby a collar or the like may be connected thereto by means for drawing the collar and flange towards each other for urging a sealing ring into sealing contact with a pipe in or through the sleeve. In one preferred embodiment the sealing ring is in a recess of the collar and is compressed between the collar and an end of the sleeve. In another preferred embodiment, the sealing ring is in an annular recess of the sleeve end and is compressed therein by the collar.

Alternatively, an external flange may be at the end of the sleeve for direct connection of a flanged pipe, valve or other piece of pipework to the coupling by any suitable means such as by bolts or by welding.

Pipe couplings of the invention may be provided for single pipe coupling ie., for one side of a concrete wall or floor, or may be provided for coupling to opposite ends thereof. For a single coupling, the sleeve preferably increases in internal diameter from its intended outer end. For a double coupling, the sleeve preferably increases in internal diameter from its ends towards its mid-region. That increase in internal diameter provides some tolerance in alignment of a pipe to be inserted into the coupling.

The external flanges of the couplings of the invention may be tapped for receiving bolts or the like for attaching the couplings to concrete casting formwork. For coupling flanges that are inwards of the sleeve ends packing pieces may be required between the flanges and the formwork. However, once the casting operation has been completed, the formwork may still be re-usable conventionally once any packing is removed.

The external flanges may be provided with anchorages, such as anchor bolts, preferably on their inner faces.

The sleeves of the couplings of the invention may be provided with one or more external puddle flanges. Furthermore, the sleeves may be stepped to accommodate pipes of different diameters at opposite ends of the couplings.

The couplings of the invention may be fixed to formwork for concrete casting in any desired position. Then after casting and removal of the formwork, pipes may be coupled to or through the coupling and sealed about their circumference.

This invention will now be further described, by way of example only, with reference to the accompanying drawings, in which.

Figure 1:
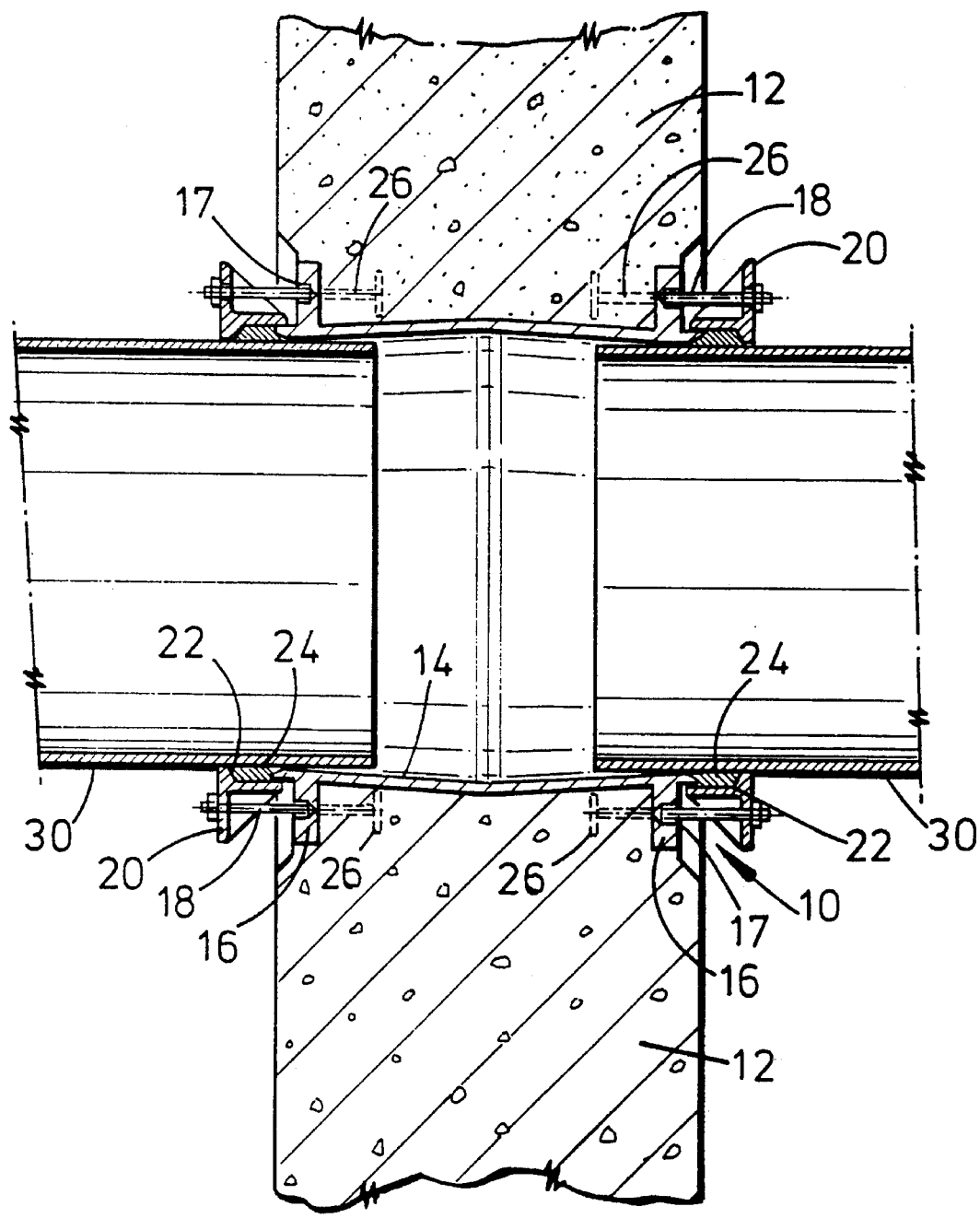
FIG. 1 is a section through a first coupling according to the invention in situ.

Referring to FIG. 1 of the accompanying drawings, a first coupling 10 is shown cast into concrete 12. The coupling 10 comprises a sleeve 14 which has an increased internal diameter in its midregion compared to its ends. Spaced in from each end the sleeve 14 has a flange 16. Each flange 16 is tapped on its outer face at 17 to receive bolts 18 for a collar 20 which has an annular recess 22 for a rubber or like sealing ring 24 such that, as tightening the bolts, the collar 20 is urged towards the flange 16 to trap and compress the sealing ring between the collar and the end of the sleeve 14. To the inward face of each flange 16 are secured anchor bolts 26.

The coupling 10 is cast into the concrete by first fixing to one side of shuttering for casting a ring of material, such as plywood, of slightly larger external diameter than the coupling flange and shaped to give a chamfered outer edge shape as shown. The sleeve is then fitted to the shuttering with its flange up against the plywood ring and the same operation repeated for the opposite shuttering. The tapped holes 17 in the flanges 16 may be used for bolts to fix the flanges to the shuttering. After casting the concrete, the shuttering is removed to leave the flanges 16 exposed. The pipes 30 to be fitted to the coupling can then be packed into position and the sealing rings and collars fitted and tightened. Because the diameter of the sleeve increases towards its middle, the pipes 30 do not have to be fitted exactly in line, as the sleeve has space for the pipes to be out of line but still sealed effectively. Alternatively, a single pipe length may be fitted through the sleeve.

As shown the sleeve 14 has the same diameter at each end. However, it is possible for the sleeve to be stepped for coupling pipes of different diameter. In addition, the sleeve may be provided with an external puddle flange.

Figure 2:
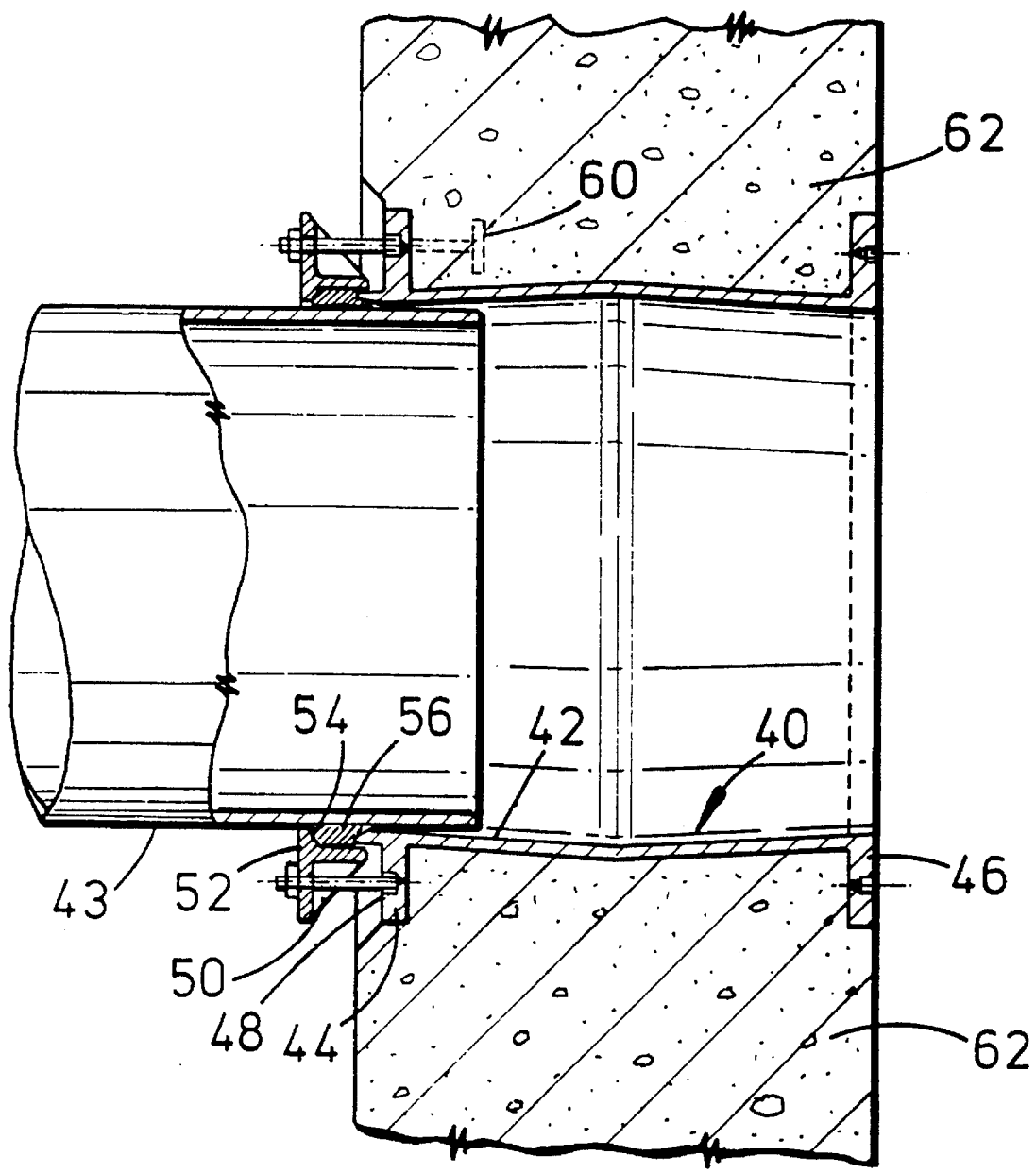
FIG. 2 is a section through a second coupling according to the invention in situ.

Turning to FIG. 2 of the accompanying drawings, a pipe coupling 40 is shown which is intended for connection to a flanged pipe or valve at one end as well as for pipe coupling at its other end in the same way as the coupling of FIG. 1. The coupling 40 comprises a sleeve 42 having a larger diameter at its mid-region than at either end, which provides a degree of tolerance for fitting a pipe 43 into the coupling. The sleeve 42 has a flange 44 spaced inwardly from one end thereof and a flange 46 at the other end thereof. The flange 44 is tapped on its outer face at 48 to receive bolts 50 for a collar 52 which has an annular recess 54 for a sealing ring 56 which is trapped between the collar and the end of the sleeve 42. When the collar and sleeve are drawn together by the bolts 50, the sealing ring is forced inwards to seal against the pipe 43 which is inserted into the sleeve. The flange 44 may also have anchor bolts 60 on its inner face.

The flange 46 is intended for direct coupling of a flanged pipe or valve in a conventional manner, such as by means of bolts or by welding.

The coupling 40 is cast into concrete 62 in a similar way to the coupling 10 except that the flange 46 is attached directly to shuttering so that after casting and removal of that shuttering, the flange 46 is flush with the concrete.

As with the coupling of FIG. 1, the sleeve 42 may be stepped for accommodating pipes of different diameter at opposite ends and puddle flange may be provided on the outer surface of the sleeve.

Figure 3:
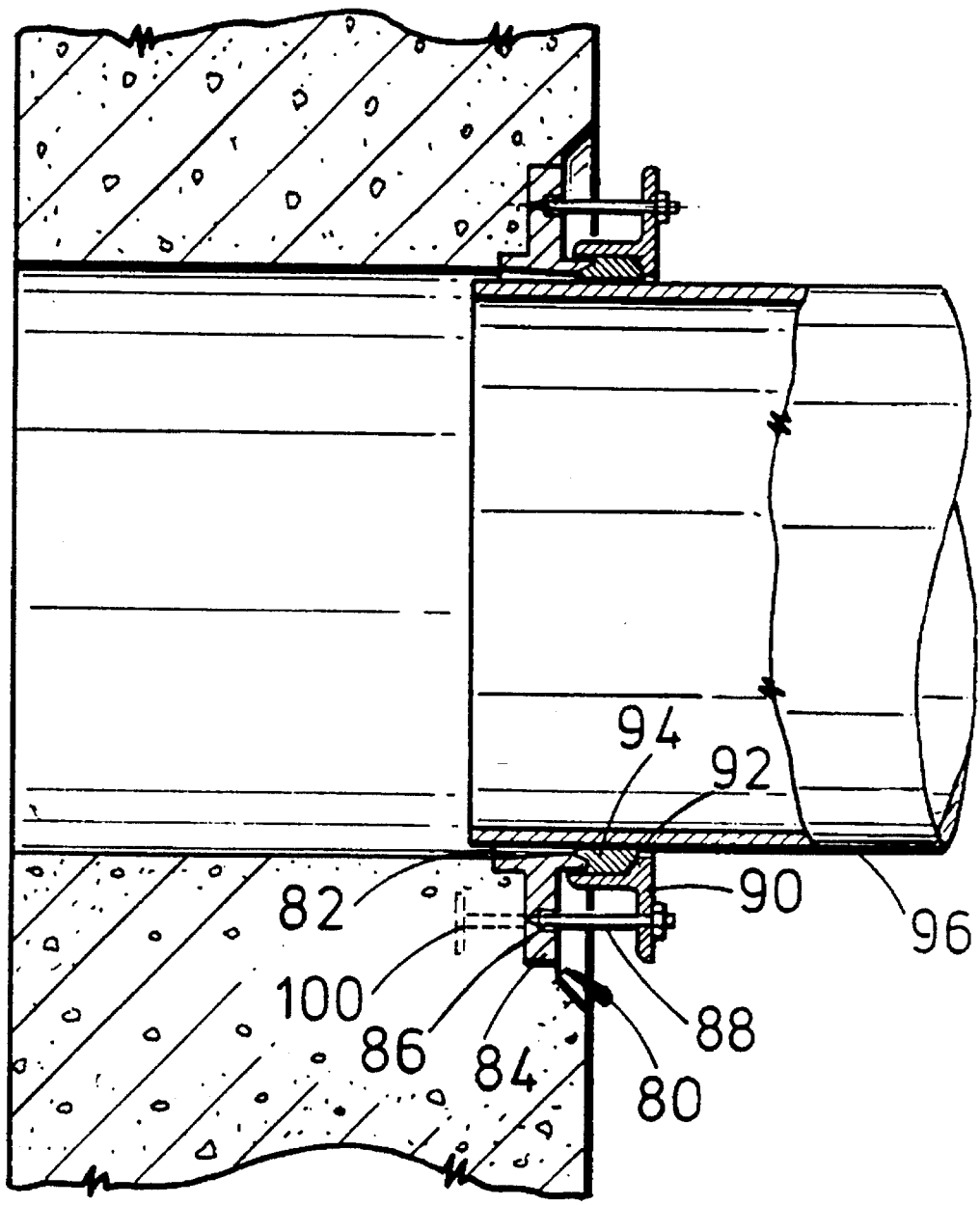
FIG. 3 is a section through a third coupling according to the invention in situ.

Finally, in FIG. 3 of the accompanying drawings, a coupling 80 is shown that is for use on one or both faces of a wall or floor. The coupling 80 comprises a sleeve 82 having a widening cross-section from one end to the other. In use the coupling 80 is cast into concrete so that the wider end of the sleeve is in inwards. The sleeve 82 has an external flange 84 which is tapped at 86 for bolts 88 for securing a collar 90 to the flange. The collar has an annular recess 92 for a sealing ring 94 which in use is trapped between the collar 90 and the end of the sleeve 82. The sealing ring when compressed between the collar and sleeve end expands inwards to seal against pipe 96 inserted into the coupling.

The coupling 80 is cast into concrete in a similar way to the coupling of FIG. 1 of the accompanying drawings. Anchor bolts 100 may be provided on the inner face of the flange 84. Because the sleeve diverges internally from its outer end, the pipe 96 does not have to exactly in line with the opening through the concrete but may be a few degrees off in any direction.

It will be appreciated that variations on pipe couplings other than those illustrated may be possible within the spirit and scope of the present invention.

I claim:

1. A pipe coupling for casting into concrete and to which at least one pipe is couplable, said coupling comprising a tapered sleeve having an external flange spaced inwardly from one end of the sleeve for attaching the coupling to formwork for concrete casting, a collar mounted on the end of the sleeve, a seal ring mounted on the collar in alignment with the end of the sleeve and means connected to the flange for drawing the collar towards the flange to urge the seal ring into sealing contact with the end of the pipe.

2. A pipe coupling as claimed in claim 1, wherein the flange is integral with the sleeve.

3. A pipe coupling as claimed in claim 1, wherein the flange is separable from the sleeve.

4. A pipe coupling as claimed in claim 1, wherein said collar has a recess and said sealing ring is in said recess of the collar and is compressed between the collar and the end of the sleeve.

5. A pipe coupling as claimed in claim 1, wherein said sleeve has an annular recess and said sealing ring is in said annular recess of the sleeve and is compressed therein by the collar.

6. A pipe coupling as claimed in claim 1 having an external flange at the end of the sleeve for direct connection of a flanged piece of pipework to the coupling.

7. A pipe coupling as claimed in claim 6, wherein the sleeve increases in internal diameter from its outer ends.

8. A pipe coupling as claimed in claim 6, wherein the sleeve increases in internal diameter from its ends towards its mid-region.

9. A pipe coupling as claimed in claim 1, wherein said means connecting includes the external flange being tapped for receiving bolts.

10. A pipe coupling as claimed in claim 1, wherein said external flange is provided with anchorages on the inward face.

11. A pipe coupling as claimed in claim 10 further comprising at least one external flange intermediate its ends.

12. A pipe coupling for connecting the ends of axially aligned pipes through a concrete wall, said coupling comprising a sleeve having an external flange formed on said sleeve and spaced inwardly from each end of the sleeve, a collar mounted on each end of the sleeve, a number of anchor bolts mounted in each of the flanges and extending through threaded openings in said collars whereby said collars can be drawn toward said flanges by turning the anchor bolts.

13. The pipe coupling according to claim 12 including a sealing ring positioned between said flanges and said collars for sealing the outer surface of the pipes in the coupling.

14. The pipe coupling according to claim 12 wherein said sleeve decreases in internal diameter from its center to its outer ends whereby the pipes are free to move within said sleeve.

15. The pipe coupling according to claim 12 wherein said collars overlap said sleeve ends.

\* \* \* \* \*